US009471205B1

(12) United States Patent
Arazi et al.

(10) Patent No.: US 9,471,205 B1
(45) Date of Patent: Oct. 18, 2016

(54) COMPUTER-IMPLEMENTED METHOD FOR PROVIDING A MEDIA ACCOMPANIMENT FOR SEGMENTED ACTIVITIES

(71) Applicants: Arnon Arazi, Cambridge, MA (US); Anna Raya Arazi, Cambridge, MA (US)

(72) Inventors: Arnon Arazi, Cambridge, MA (US); Anna Raya Arazi, Cambridge, MA (US)

( * ) Notice: Subject to any disclaimer, the term of this patent is extended or adjusted under 35 U.S.C. 154(b) by 420 days.

(21) Appl. No.: 14/209,431

(22) Filed: Mar. 13, 2014

Related U.S. Application Data (60) Provisional application No. 61/782,682, filed on Mar. 14, 2013.

(51) Int. Cl.
*G06F 3/00* (2006.01)
*G06F 3/0484* (2013.01)
*G06F 3/01* (2006.01)

(52) U.S. Cl.
CPC .................................. *G06F 3/0484* (2013.01)

(58) Field of Classification Search
None
See application file for complete search history.

(56) References Cited

U.S. PATENT DOCUMENTS

| | | | | |
|---|---|---|---|---|
| 6,898,759 B1 * | 5/2005 | Terada | ................. | G10H 1/0066 345/473 |
| 7,521,623 B2 * | 4/2009 | Bowen | ..................... | G10H 1/40 84/612 |
| 7,824,309 B1 * | 11/2010 | Tadlock | ............. | A63B 24/0021 482/1 |
| 2004/0089141 A1 * | 5/2004 | Georges | ............... | G10H 1/0025 84/609 |
| 2006/0169125 A1 * | 8/2006 | Ashkenazi | ......... | A63B 71/0686 84/612 |
| 2008/0258921 A1 * | 10/2008 | Woo | ..................... | A61B 5/0002 340/573.1 |
| 2008/0269017 A1 * | 10/2008 | Ungari | ............... | A63B 69/0053 482/4 |
| 2009/0233770 A1 * | 9/2009 | Vincent | ............. | A63B 24/0021 482/8 |
| 2012/0151344 A1 * | 6/2012 | Humphrey | ............. | G09B 5/065 715/716 |
| 2013/0132837 A1 * | 5/2013 | Mead | ..................... | G06Q 10/10 715/716 |
| 2013/0290818 A1 * | 10/2013 | Arrasvuori | ......... | H04N 21/4383 715/201 |
| 2015/0309703 A1 * | 10/2015 | Robertson | ............ | G10H 1/0025 715/716 |
| 2015/0309844 A1 * | 10/2015 | Lowe | ..................... | G06Q 30/02 715/716 |

* cited by examiner

*Primary Examiner* — Toan Vu
(74) *Attorney, Agent, or Firm* — Sunstein Kann Murphy & Timbers LLP (57) ABSTRACT

A computer-implemented method provides a media accompaniment for an activity having a set of segments, and has computer processes including: receiving and storing a first user input, if provided, defining the set of segments for the activity; retrieving a set of media files that are appropriate for each of the defined segments; receiving and storing a second user input, if provided, defining a set of media files for each of the defined segments; receiving a third user input, if provided, defining a set of playback parameters for each of the defined media files; receiving a fourth user input signaling the beginning of the activity; and causing play back of the defined set of media files according to the defined set of playback parameters.

18 Claims, 5 Drawing Sheets

COMPUTER-IMPLEMENTED METHOD FOR PROVIDING A MEDIA ACCOMPANIMENT FOR SEGMENTED ACTIVITIES

RELATED APPLICATION

The present application claims the benefit of U.S. provisional application Ser. No. 61/782,682, filed Mar. 14, 2013, which is hereby incorporated herein by reference in its entirety.

TECHNICAL FIELD

The present invention relates to media players, and more particularly to media players for accompaniment of activities.

BACKGROUND ART

Certain types of human activities benefit from having a media accompaniment and, in particular, a musical accompaniment. Examples of such activities include dance lessons, aerobics, and social events. At present, there are two alternative ways to provide such an accompaniment: live performance, and played-back, pre-recorded media.

Both currently existing methods have their disadvantages. Live performance has three main problems: high costs, limited repertoire and imperfect quality. First, human labor is typically more expensive than using machines; in particular, employing performers is significantly more costly than using pre-recorded media. Furthermore, the memory capacity of an average person is by far more limited than that of a computer: For example, a typical classical pianist is able to play a few dozen musical pieces by heart, while a leading classical music database, such as the Naxos Music Library (http://www.naxosmusiclibrary.com), contains over a million of recorded tracks. Finally, in many cases the limited repertoire of performers does not meet the real-time requirements of the activity, forcing the performer to improvise. The result is usually an inferior quality of the accompaniment, compared to well-rehearsed and polished material composed by great masters. This problem is particularly acute in classical ballet accompaniment.

The central problem of using pre-recorded media is the lack of real-time flexibility and responsiveness. With live performance, it is typically possible to spontaneously set requirements on the fly. For instance, one can ask a musician to switch to another style or to perform a specific composition. To achieve a similar flexibility when using pre-recorded media, extensive time-consuming preparations are required. These include meticulous planning of all possible scenarios the activity can turn to, searching for and choosing the most appropriate media files, acquiring them, editing them if necessary, transferring them into a playable format and, finally, validating their quality and applicability for the activity. Thus, for an hour-long activity the preparations can easily take double or triple the time. Moreover, even after these lengthy preparations, using the final product of these efforts in real-time still requires the constant attention of the person running the activity.

SUMMARY OF THE EMBODIMENTS

Embodiments of the present invention enable planning and playing a media accompaniment for activities composed of a set of segments, by means of a computer-implemented method. Examples of such activities are dance lessons, figure-skating and aerobics consisting of a set of exercises. The embodiments solve most of the problems of prior art dealing with the same task. This is accomplished in a number of ways. First, by virtue of the fact that such embodiments are computer-implemented, their application has the potential to be less costly for users, compared to human labor. Second, embodiments of the present invention include a large database of pre-recorded media files, surpassing the limited repertoire typically available when using live performance. Moreover, using pre-recorded media files ensures the high quality of the provided accompaniment, due to the available technological tools for recording and editing such files. Furthermore, such embodiments provide a user interface for defining the segments composing the activity, the media accompaniment associated with each segment, and various parameters defining the playback of each media file, while ensuring that only an appropriate accompaniment is available for selection for each segment. This enables users (e.g. dance instructors) to choose the desired accompaniment in a relatively rapid manner. The result is a major improvement compared to the time-consuming preparations required when using existing methods for providing pre-recorded media.

Further embodiments may receive additional user inputs during the activity, defining modifications to the playback parameters of media files. Such modifications may specify a change in the tempo of a played file, while keeping the pitch unaffected, or may define an action to be performed with regard to a media file, e.g. start playing, stop playing, skip to the next file etc. Alternative embodiments may provide different ways to receive these additional user inputs: some embodiments may enable the usage of a remote control device for defining modifications of playback parameters, while other embodiments may allow using speech for the same purpose. This increases the flexibility and real-time responsiveness of embodiments according to the present invention, decreasing in the process the degree of attention required from the person running the activity (e.g. dance instructor), and as a result granting such embodiments an additional advantage over existing methods for providing a pre-recorded accompaniment.

Alternative embodiments allow users to store user inputs and additional information for future activities; for example, some such embodiments may allow storing the segments and media files composing an activity, as well as the playback parameters defined to each media file, and retrieving them in a later occasion. This can further decrease the set-up time required for defining a media accompaniment for an activity.

Further embodiments, which allow both storing user-specific information for future activities and receiving user input through speech, may include certain characteristics of the speech of the user in the stored information. This information can be used to further improve the speech recognition accuracy of such embodiments, in turn enhancing their real-time responsiveness.

Alternative embodiments may store user inputs in usage logs. This enables issuing invoices to users based on the actual usage of such embodiments. In particular, this allows calculating royalties due to the playback of media files for which the copyrights are owned by a third party, in turn making it possible to include in the database of media files practically any pre-recorded accompaniment, for instance recordings by symphony orchestras or world-renown rock bands. As a result, the repertoire available using such embodiments can be greatly superior to that offered through the usage of live performance.

Alternative embodiments may allow capturing the activity on video, tagging the position of each segment within this file, and viewing the recorded footage during or after the activity. This enables users to analyze the events taking place during the activity; for example, in the case where the activity is a dance lesson, this allows the dance instructor and the students to review and analyze their performance during the lesson.

Alternative embodiments may enable users to store, at the end of an activity, information associated with it, including the segments comprising the activity, unique identifiers of the media files used to accompany each segment, the playback parameters used in playing them, and the media files themselves. This can potentially allow users to later upload the stored information to a computer software capable of recreating the activity in other settings. For example, in case the activity is a dance lesson, this may enable the students to practice at their homes while using the exact music, tempi etc as used during the lesson itself, thus improving the efficiency of their practice and their preparedness for future lessons. This feature is not currently offered by existing methods providing a media accompaniment for activities of the type discussed.

Further embodiments, which in addition allow to video-capture the activity, may also support exporting the recorded footage as part of the activity-associated information, that can then be viewed separately. In the case the activity is, for example, a dance lesson, this can again improve the value of home practice by the students.

One embodiment of the invention is a computer-implemented method for providing a media accompaniment for an activity having a set of segments. The method of this embodiment includes computer processes, and the computer processes include:

receiving and storing a first user input, if provided, defining the set of segments for the activity, and if not provided, then defining the set of segments by default;

retrieving a set of media files that are appropriate for each of the defined segments;

receiving and storing a second user input, if provided, defining a set of media files for each of the defined segments, and if not provided, then defining the set of media files by default;

receiving a third user input, if provided, defining a set of playback parameters for each of the defined media files, and if not provided, then defining the set of playback parameters by default;

receiving a fourth user input signaling the beginning of the activity; and causing play back of the defined set of media files according to the defined set of playback parameters.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions

As used in this description and the accompanying claims, the following terms shall have the meanings indicated, unless the context otherwise requires:

a. A "set" has at least one member.
b. An "activity" is a set of segments, where each segment has a label taken from a pre-defined set of labels.
c. A "playback parameter" is a parameter defining an attribute associated with playback of one or more media files. Attributes may include, but are not limited to, the tempo in which the media file should be played back; whether the playback should be repeated and, if so, how many times; sound level for playback, etc.
d. A "computer process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

Embodiments in accordance with the present invention enable providing, by means of a computer-implemented method, a media accompaniment for various activities, where an activity contains a set of segments. Such embodiments offer a fast and convenient way to specify the set of segments comprising the activity and the media files that will accompany these segments, while ensuring that the provided accompaniment will be appropriate for each segment. For example, in some embodiments an activity may be a dance lesson, and each segment will be an exercise. In this case, the media accompaniment chosen will match each exercise, while taking into account its musical meter, mood etc.

Figure 1:
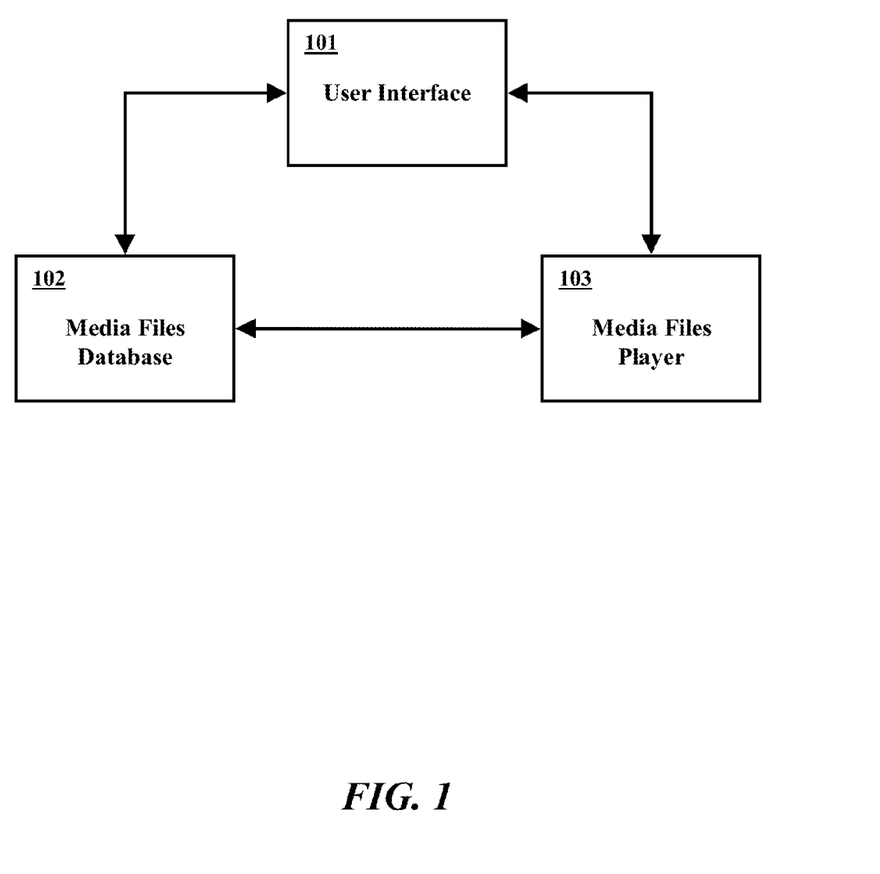
FIG. 1 is a block diagram of system architecture for an embodiment of the present invention, showing components of the system and interactions among them.

FIG. 1 is a block diagram of software system architecture for an embodiment of the present invention, showing components of the system and interactions among them. In various embodiments of the present invention, the software may be programmed to run in any of a wide range of micro-processor based computer environments, including computers running the Microsoft Windows operating system, for example, Windows 7 or 8, available from Microsoft Corporation, Redmond, Wash., as well as computers running the Apple operating system, for example, OS X, available from Apple Inc., Cupertino, Calif. Alternatively, the software may be programmed to run in a smartphone environment, including smartphones running the iOS operating system, from Apple Inc., Cupertino, Calif., or smartphones of numerous brands (including Samsung, Sony, LG, etc.) running the Android operating system developed by Google, Inc., Mountain View, Calif.

The components of FIG. 1 include a User Interface 101, a Media Files Database 102, and a Media Files Player 103. The User Interface 101 is a software component configured to provide a structure for specific information obtainable from a user, to receive the information provided by the user, and to cause storage of the information in memory. Existing computer languages and development environments offer numerous convenient ways to implement such a component. Specific embodiments may further implement methods for dealing with partial or no input, by applying some default choices or values. For instance, if a user did not specify any segments, some default set of segments may be assumed, based on domain-specific knowledge (e.g. a unique structure of activities of the relevant type). Similarly, if a user chose to specify designated media files for only some of the segments, the rest of the segments may be assigned specific media files randomly, based on some preference order, or according to other arbitrary procedures. In a typical embodiment, the user interface is a graphical user interface, in which the user can specify selections graphically using a mouse and optionally a keyboard to make entries in appropriately structured graphical windows. Examples of such user interface are provided in FIGS. 3A and 3B.

The Media Files Database 102 is a software component enabling the storage and retrieval of two types of information: media files and additional information pertaining to each media file. Depending on the embodiment, media files may be stored locally in designated directories, or on remote servers over a network (e.g. the Internet). Several different formats are currently available for media files (for example, windows media audio (WMA), mp3 (MPEG Layer III Audio), mp4 (MPEG-4 Part 14, a multimedia format), etc.).; the specific choice of supported formats may vary between different embodiments. The additional information stored in the Media Files Database with regard to each media file includes at least the following: the location of the media file (local directory or network location), and a list of types of segments for which the media file is appropriate to serve as an accompaniment. Further embodiments may store supplementary information, such as the tempo of the media file. Depending on the embodiment, the additional information may be stored in, among others, text files, binary files or using designated software databases.

The Media Files Player 103 is a software component capable of playing back media files. There are several possible ways in which such a media player can be implemented: some existing programming languages offer built-in components for this purpose; alternatively, several open-source and commercial software libraries implementing media players are currently available. See for example, http://www.videolan.org/.

Figure 2:
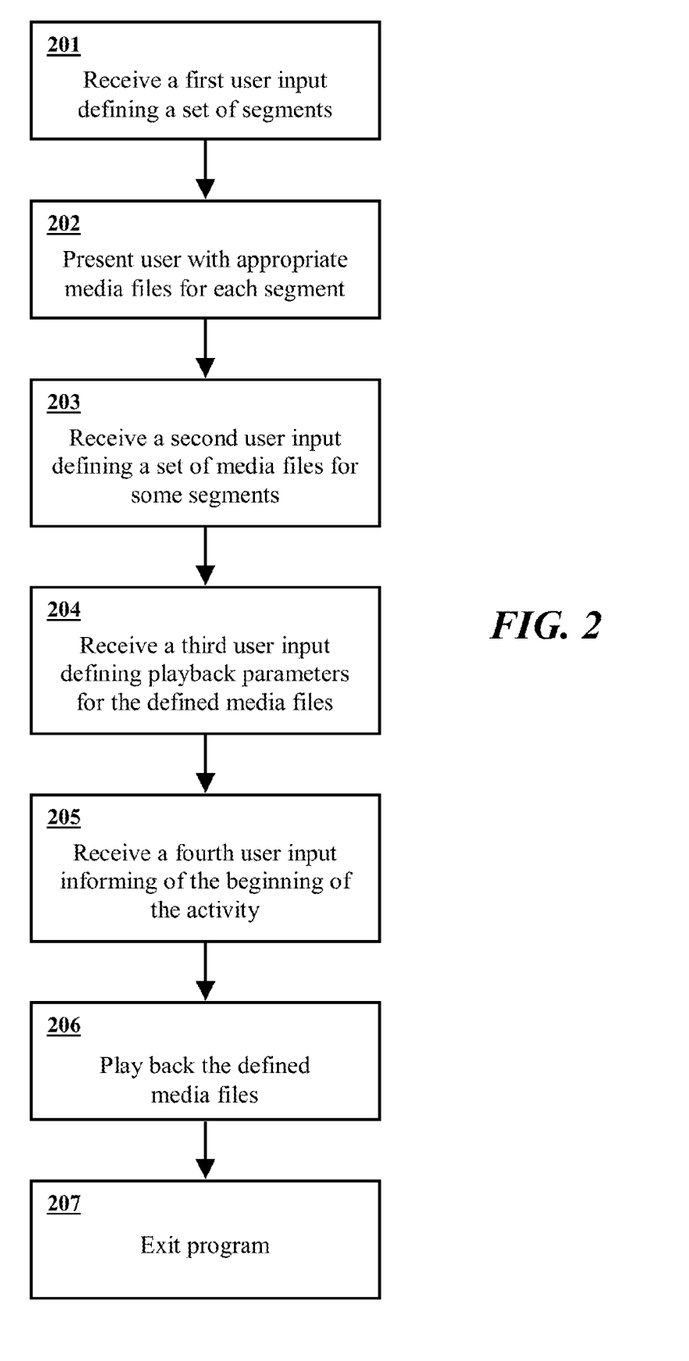
FIG. 2 is a block diagram showing general logical flow of a method according to embodiments of the present invention.

FIG. 2 is a block diagram showing general logical flow of a method according to embodiments of the present invention. In process 201, the method receives a first user input defining a set of segments through the User Interface 101. In process 202, based on the information stored in the Media Files Database 102, the user is presented with a choice of media files appropriate for each segment. In process 203, the method receives a second user input, defining a choice of media files to accompany some or all of the segments. In process 204, the method receives a third user input, defining a set of playback parameters for each media files. In process 205, the method receives a fourth user input, informing the method of the beginning of the activity. In process 206, the method plays back the media using the Media Files Player 103. In process 207, the computer program exits at the end of the activity.

Figure 3A:
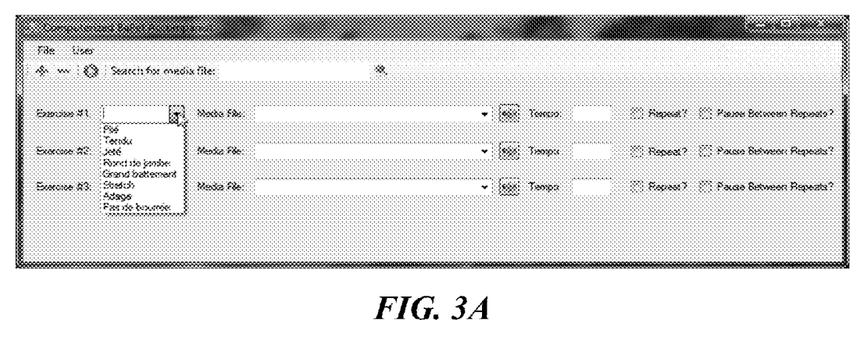
FIGS. 3A and 3B are representations of display screens, in an embodiment of the present invention, for receiving user inputs defining ballet exercises and media files used for their accompaniment.
Figure 3B:
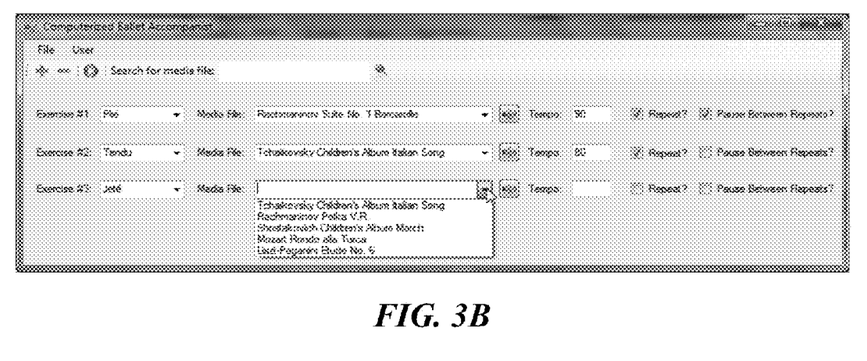

FIGS. 3A and 3B are representations of display screens, in an embodiment of the present invention, providing a user interface for receiving user inputs defining segments and media files used for their accompaniment. In the embodiment presented, the activity is a ballet lesson, and the segments are ballet exercises, such as Plie, Tendu, Jete etc. These screens employ drop-down lists to allow the user to choose the name of each exercise (FIG. 3A) and the media file accompanying the exercise (FIG. 3B). The list of media files possible for each exercise contains all the media files appropriate for the specified exercise, based on the information stored in the Media Files Database 102.

In further embodiments, optionally, there may be provided a mechanism for receiving a further user input, which we term an "in-play" user input, after the activity has begun, either (a) informing the system that the lesson or other activity is over and that therefore the computer should be stopped or (b) causing the defined playback parameters to be subject to modification. Typically, such a modification will be with regard to the media file playing at the moment or to media files not yet played during the activity. In embodiments capable of receiving this type of input, the User Interface 101 updates the Media Files Player 103, which in turn plays back the relevant media files according to the modified parameters. In this embodiment, the software processes test repeatedly for the presence of an in-play user input, and when such an input is sensed, cause appropriate branching consistent with the input.

In other related embodiments, the in-play input may define in particular a required change of tempo, while keeping the pitch unaffected. To implement this, the Media Files Player 103 should be capable of changing the tempo of a played back media file without altering its pitch. Several existing algorithms and software libraries enabling this are currently available.

In other embodiments, the modification of playback parameters received as a part of the in-play input may include certain actions regarding the media file playing at the moment the in-play input is received or, if no media file is played at the moment, the media file to be played next, according to the set of media files received in the second input 203. Possible actions may include, but are not limited to, the following options: start playing, stop playing, pause, fast-forward, rewind, skip forward to the next media file, skip back to the previous media file, and repeat the recent media file played.

The mode through which the in-play input is received may differ between embodiments. In some embodiments, this is achieved by means of using a remote control device. In this case the User Interface 101 is capable of receiving information from such a device. There are several existing remote control devices that can be plugged into a computer, with accompanying software drivers that allow interpreting the actions of the remote control devices as standard input (e.g. mouse buttons or keyboard keys being pressed).

In other embodiments, the further input may be received in the form of speech, either explicit (i.e. directed at the computer) or implicit (i.e. directed at the participants of the activity). In particular, a user may employ speech to order specific actions with regard to a media file (e.g. "play", "stop", "pause" etc.), may utter the name of a segment for which a media file should be next played, or may use speech to specify the tempo in which a media file should be played.

Figure 4:
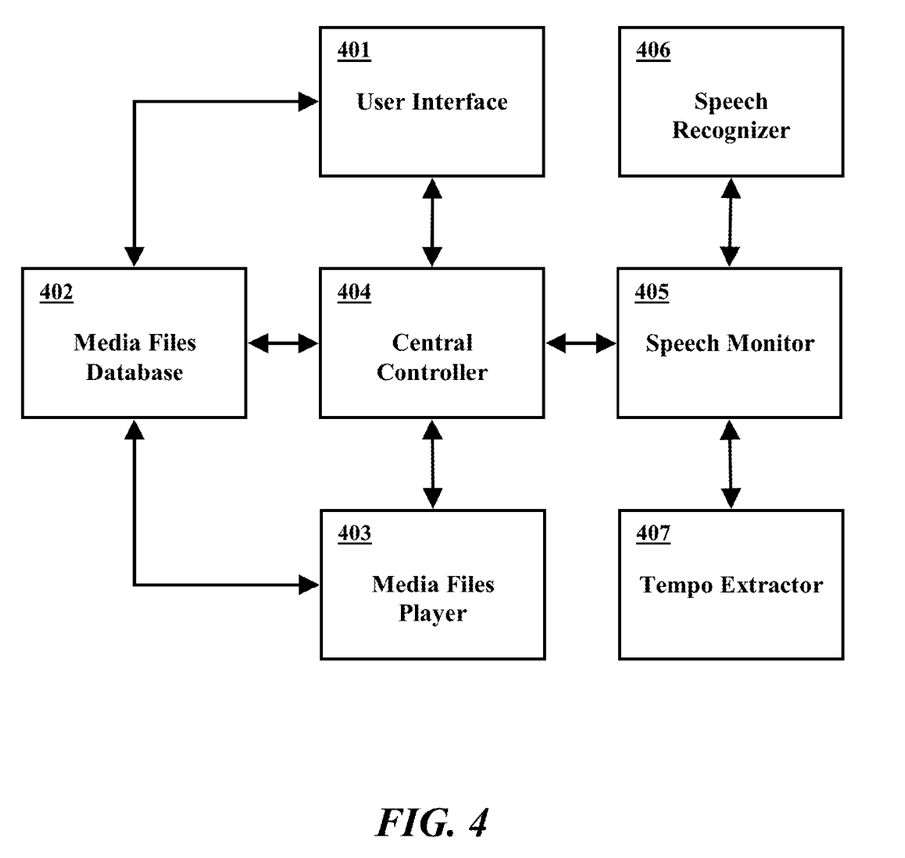
FIG. 4 is a block diagram of system architecture for an embodiment of the present invention, similar to that of FIG. 1, but having further components, among other things for speech input and tempo extraction.

FIG. 4 is a block diagram of system architecture for an embodiment of the present invention, similar to that of FIG. 1, but having further components, among other things for speech input and tempo extraction. In addition to the three components shown in FIG. 1—a User Interface 401, a Media Files Database 402 and a Media Files Player 403, this embodiment includes a Central Controller 404, a Speech Monitor 405, a Speech Recognizer 406 and a Tempo Extractor 407. The Speech Monitor 405 is a software component responsible to continuously extract digital speech samples from the computer audio input devices (typically a microphone) and to transfer these to the Speech Recognizer 406 and to the Tempo Extractor 407. The Speech Recognizer 406 is a software component capable of recognizing words uttered by the user; there are presently a number of such software components available, both open-source and commercial. The Tempo Extractor 407 is a software component capable of identifying the underlying tempo of speech utterances, if the speech is uttered rhythmically. This is particularly relevant for the case in which the activity is a dance lesson. In such lessons, the instructor usually explains an exercise to be performed by demonstrating it while uttering the steps composing the exercise. Typically this is done in a rhythmic manner, reflecting the tempo in which the exercise should be performed. This means that the speech would be accented based on the tempo, e.g. the first beat in each bar is pronounced louder. In such a case, the tempo may be extracted from the instructor's speech by analyzing the duration between consecutive peaks in the speech amplitude, and by further applying some constraints based on domain-specific assumptions—for example, with regard to the range of possible tempi given the next segment.

The Central Controller 404 is a software component responsible for coordinating the actions of the other components of the embodiment. This is required because certain components, in particular the Speech Monitor 405, the Speech Recognizer 406, the Tempo Extractor 407 and the Media Files Player 403, may be implemented in the described embodiment using separate computer processes which may run in parallel. The Central Controller 404 is also responsible to process the information received from the other components and to decide on appropriate actions based on it.

Figure 5:
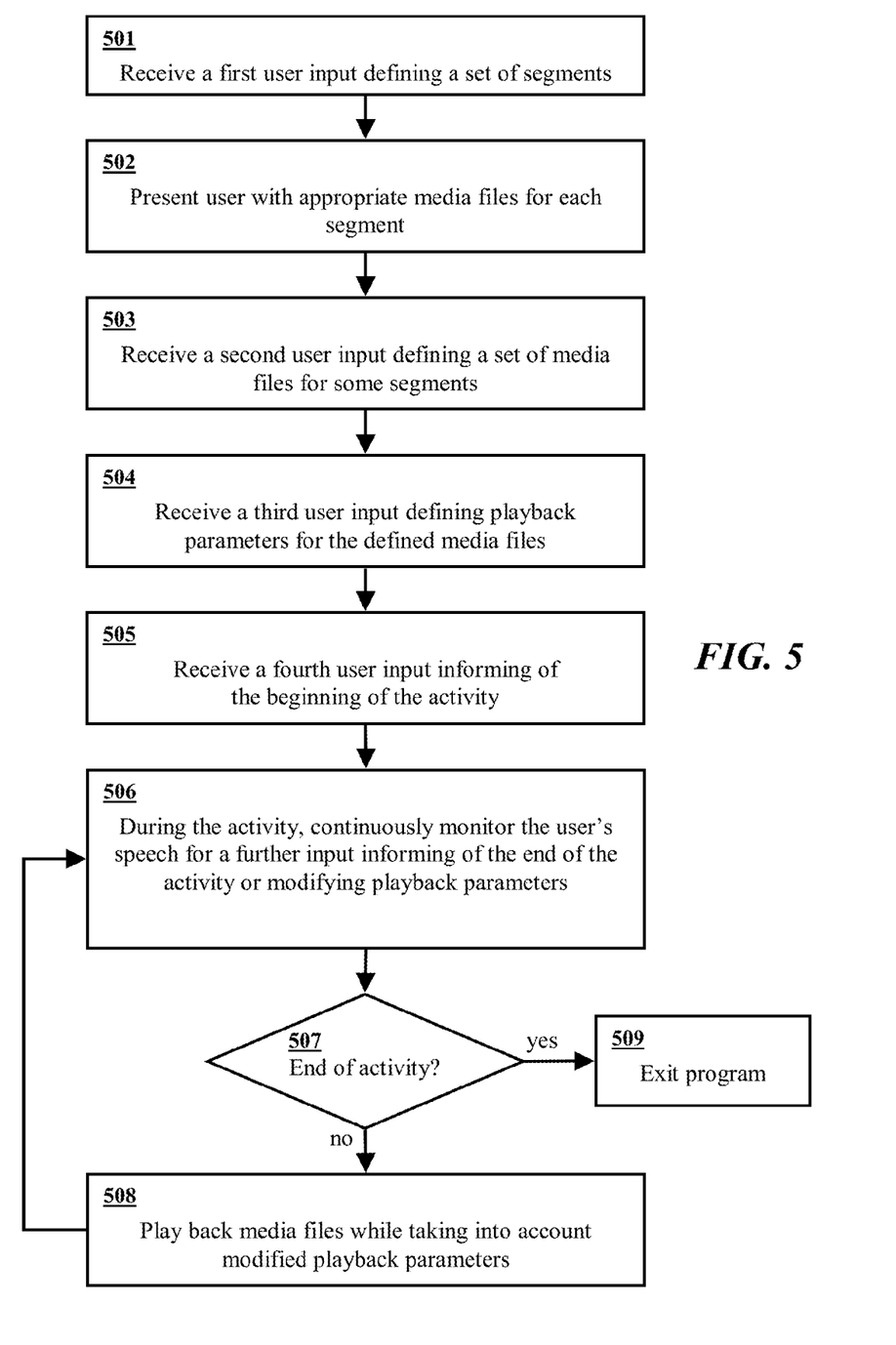
FIG. 5 is a block diagram showing logical flow of the embodiment of FIG. 4.

FIG. 5 is a block diagram showing the logical flow of the embodiment described in FIG. 4. Similarly to the logical flow illustrated in FIG. 2, in processes 501-505 the method receives four user inputs, defining a set of segments, a set of media files and a set of playback parameters for each media file, and informing the method of the beginning of the activity. In process 506 the user's speech is continuously monitored during the activity for an in-play input. This in-play input may specify a modification of the playback parameters of certain media files, typically the one currently playing or the next one to be played, or may inform the method of the end of the activity. In process 507 the in-play input received is being decoded. If the in-play input specifies a modification of playback parameters, in process 508 the corresponding media files are played back while taking into account any identified required modification of playback parameters. In the described embodiment, such modifications may request a change of tempo or the start, stop, pause etc. of the playing-back of a media file. If the in-play input informs the method of the end of the activity, or if all media files have been played, the program exits in process 509.

The logical flow presented in FIG. 5 may be implemented by an embodiment having the system architecture shown in FIG. 4 in the manner described below. Initially, the User Interface 401 receives the first user input, defining a set of segments. Next, the User Interface 401 queries the Media Files Database 402 in order to retrieve a set of media files appropriate for each segment. The user is then presented with a list of appropriate media files. Subsequently, the User Interface 401 receives a second input defining a specific choice of media files, followed by a third user input defining playback parameters (e.g. tempo) for some of the media files and a fourth user input informing of the beginning of the activity. The User Interface 401 then transfers this information to the Central Controller 404, which starts the computer process corresponding to the Speech Monitor 405. The Speech Monitor 405 in turn starts the computer processes corresponding to the Speech Recognizer 406 and the Tempo Extractor 407. The Speech Monitor 405 continuously extracts audio samples from the computer audio input device (e.g. a microphone), and transfers these samples to the Speech Recognizer 406 and Tempo Extractor 407. The Speech Recognizer 406 informs the Speech Monitor 405 of any words recognized in the user's speech. In parallel, the Tempo Extractor 407 transfers information regarding speech segments, which are uttered in rhythm, together with the tempo corresponding to these segments, to the Speech Monitor 405. The Speech Monitor 405 then transfers this information to the Central Controller 404 which processes it. If the Speech Recognizer 406 identifies a pre-defined sequence of words informing of the end of the activity (e.g. "End lesson"), the Central Controller 404 instructs the Media Files Player 403 to stop the playback of any currently playing media files, and the program exits. Alternatively, the Speech Recognizer 406 and the Tempo Extractor 407 may identify an input specifying a modification of playback parameters. Based on the identified input, the Central Controller 404 may instruct the Media Files Player 403 to start playing a media file, to stop, pause or repeat the playing of a currently played file, to fast-forward, rewind or to skip to another media file. Furthermore, the Central Controller 404 may instruct the Media Files Player 403 to change the tempo of the currently playing media file, or the next one to be played.

In certain embodiments, the performance of the above components may be enhanced by taking into account information specific to the actual activity. For example, when the activity is a ballet lesson, the accuracy of the Speech Recognizer 406 may be improved by considering in the recognition process only a limited vocabulary of ballet terms by means of which ballet exercises are typically specified. Furthermore, since ballet lessons have a relatively fixed structure with a strict order of exercises, the Central Controller 404 may take into account this structure while processing the user speech, as decoded by the Speech Recognizer 406 and the Tempo Extractor 407. Thus, the Central Controller 404 may dismiss as erroneous some of the words recognized by the Speech Recognizer 406. This would occur, for example, if these words do not correspond to ballet terms expected, based on the specified set of ballet exercises and the current stage in the ballet lesson.

Various embodiments may allow users to store some of user inputs to be used in future activities. For example, a user may wish to store the set of segments and some of the media files defined for them, to avoid the need to input them again in future activities. This functionality can be implemented by storing list of user names. When a user wishes to use the embodiment, he is prompted first by the embodiment to input a user name; the name is then checked against the stored list. If it does not appear in it, it may be added to it for future sessions. If, however, the user name does appear in the list, any information previously stored for the user is retrieved and made available for the user. In such a case, for example, the user may wish to load previously defined sets of segments, media files defined for specific segments, and playback parameters defined for such media files. The exact manner through which such information is stored may differ between specific embodiments, and may involve for example files stored on a local computer or on a file server over the Internet.

A special case of interest is related to embodiments which receive user inputs through speech and which in addition allow users to store information for future activities. Some such embodiments may store, as part of the user-specific information, parameters associated with the user's specific manner of speech, to improve the performance of speech recognition by the embodiment. The actual way through which this is carried out is dependent on the implementation of speech recognition by the embodiment. Most modern speech recognizers employ stored generic sets of computer files termed "acoustic models", which represent basic units of speech—for example, phonemes within a specific acoustic context. For such recognizers, improvement in speech recognition performance may be achieved by adapting the generic stored acoustic models to each user. This can be accomplished by storing for each user a designated set of acoustic model files, which are based on the generic acoustic models, but are further modified to reflect the specific characteristics of the user's speech. To do this, particular embodiments may request the user to utter pre-defined sentences or words into the computer microphone before starting an activity. For example, this may take place on the first time a user name is given, i.e. when a user name not appearing in the list of known users is specified. The uttered speech may then be stored in audio files, which in turn may be used as an input to algorithms adapting the stored acoustic models, i.e. changing their different parameters to better reflect the specific speech characteristics of the user. Several such adaptation algorithms exist, and their performance depends, among others, on the actual speech recognizer used as part of the embodiment. The adapted user-specific acoustic models can then be stored for future use. The next time the user logs-in, these acoustic models will be retrieved and used for decoding the speech of the user during the activity.

Alternative embodiments may store the different user inputs in a usage log. This is particularly relevant in two scenarios. First, in certain settings it may be desirable to charge the user for running the embodiment based on actual usage, for example the number of media files played, the total duration of usage, the number of activities accompanied etc. In this case, based on the stored usage log, periodic invoices may be regularly generated, specifying a fee to be paid for the corresponding period. Second, if the copyrights for the media files played are owned by a third party, it may be necessary to generate periodic invoices specifying the royalties the user needs to pay for these owners. In this case, the usage logs may be used as a basis for such invoices.

An additional feature, supported by various embodiments, allows the user to capture the activity on video. To do this, a video camera connected to the computer can be used. The video camera is activated at the beginning of the activity, and starts capturing and storing video footage of the activity. Typically, this information is written into a video file. In parallel, the position within the video file of each segment is stored, to later allow the user to skip to the video footage of a desired segment. This is accomplished by writing into a file a list specifying a unique identifier for each segment, the timestamp within the video file in which the segment begins, together with the name of the video file.

Particular embodiments may further allow the user to play the recorded video file at specific times during the activity. For example, if the activity is a dance lesson, this feature may be useful for the dance instructor to show the students how they performed different dance exercises, to point out mistakes that need correction etc. Embodiments supporting this feature may continue video recording even while the user is viewing the captured video. Once the user chooses to view the video captured in the activity up to that point in time, the computer process stops writing to the current video file and starts writing to a new video file.

Embodiments of the present invention may implement an additional feature, allowing the user to export all system data associated with an activity. This includes the set of segments, the media files associated with each segment, the playback parameters used for each media file, and the media files themselves. These data can then be stored in a manner that will allow their later import into a software tool capable of decoding them, running on a different computer. In particular such a software tool may play back the media files in the same manner they were played during the activity. This feature can be extremely useful when the activity is a dance lesson. For example, at the end of the lesson, the dance instructor may choose to export all the system data associated with the dance lesson into a set of files, which can then be given to the students. On a later occasion, the students can import these data to an appropriate software tool running for example on their personal desktop computer, in order to practice using media files and settings identical to those used in the actual lesson. This feature, which is not offered by any existing methods providing a media accompaniment for dance lessons, is expected to improve the efficiency of the practice, and to better prepare the students for future lessons.

Furthermore, in the case of embodiments capable as well to video-capture the activity, the exported and imported system data associated with the activity can include the video footage of the activity. Thus, in the above example of a dance lesson, the students can practice while seeing the actual demonstration of segments by the dance instructor, as well as their own and their peers' performance during the lesson. This feature can enhance the value and efficiency of home practices.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

While the invention has been particularly shown and described with reference to specific embodiments, it will be understood by those skilled in the art that various changes in form and detail may be made therein without departing from the spirit and scope of the invention as defined by the appended clauses. As will be apparent to those skilled in the art, techniques described above for panoramas may be applied to images that have been captured as non-panoramic images, and vice versa.

Embodiments of the present invention may be described, without limitation, by the following clauses. While these embodiments have been described in the clauses by process steps, an apparatus comprising a computer with associated display capable of executing the process steps in the clauses below is also included in the present invention. Likewise, a computer program product including computer executable instructions for executing the process steps in the clauses below and stored on a computer readable medium is included within the present invention.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A computer-implemented method for providing a media accompaniment for an activity having a set of segments, where the activity is a lesson involving movements of the body and each segment is an exercise involving a set of movements, the method including computer processes comprising:
   receiving and storing a first user input defining the set of segments for the activity, or in absence of the first user input, then defining the set of segments by default;
   retrieving a set of media files that are appropriate for each of the defined segments;
   receiving and storing a second user input defining a set of media files for each of the defined segments, or in absence of the second user input, then defining the set of media files by default;
   receiving, for each one of the defined media files, a third user input defining a distinct set of playback parameters, or in absence of the third user input, then defining the distinct set of playback parameters by default, the distinct set of parameters including a designation of tempo, wherein tempo modification to the designated tempo is achieved without modification of pitch;
   receiving a fourth user input signaling the beginning of the activity; and
   causing play back of the defined set of media files according to the defined set of playback parameters.

2. A method according to claim 1, the computer processes further comprising:
   repeatedly testing for the presence of an in-play user input during the activity, wherein the-in play user input is either a change signal that includes a modification of at least one member of the set of playback parameters or an end-of-activity signal;
   if the in-play user input is determined to be present, then decoding the in-play user input;
   if the decoded in-play input is an end-of-activity signal, exiting the computer program accompanying the activity;
   if the decoded in-play input is a change signal, adjusting the playback of the media file according to the modification.

3. A method according to claim 2, wherein the modification of playback parameters includes one playback action, selected from the group consisting of start, stop, pause, fast-forward, rewind, skip forward, skip back, repeat, and adding an additional segment to be accompanied.

4. A method according to claim 3, wherein the in-play user input is received from a remote control device, and wherein decoding the in-play user input includes deciphering a command from the remote control device.

5. A method according to claim 3, where the in-play user input is received in the form of speech, and wherein decoding the in-play user input includes using a speech recognition module.

6. A method according to claim 2, the computer processes further comprising:
   storing the first, second, third and the in-play user inputs in a usage log.

7. A method according to claim 6, further comprising:
   based on the usage log, calculating a fee for using the method; and
   causing communication to the user of an invoice based on the calculated fee.

8. A method according to claim 6, the computer processes further comprising:
   based on the usage log, calculating royalties to holders of copyrights in the media files; and
   causing communication to the user based on the calculated royalties.

9. A method according to claim 1, the computer processes further comprising:
- prior to receiving the first user input, receiving a user name input specifying a user name;
- checking whether the user name appears in a stored list of known user names;
- if the user name does not appear in the stored list, adding the user name to the stored list;
- if the user name does appear in the stored list, checking if any user information was previously stored;
- if any user information was previously stored, retrieving the previously stored user information and applying the user information as applicable to any of one or more of the first, second and third user inputs; and
- receiving and storing any update to the user information.

10. A method according to claim 1, the computer processes further comprising:
- causing video capture and storage of the activity via a video camera coupled to a computer running the processes; and
- storing a video list specifying, for each segment, a unique identifier and a timestamp in which it begins in the captured video.

11. A method according to claim 10, the computer processes further comprising:
- receiving a user video interaction input during the activity specifying playback actions to be further applied to the captured video, selected from the group consisting of: start, stop, pause, fast-forward, rewind, go to specific segment;
- responsive to the user input, playing back the stored captured video, while
- causing video capture and storage, in a new video file, of the activity carried on during playback.

12. A method according to claim 11, the computer processes further comprising:
- after the end of the activity, receiving a user storage input;
- responsive to the user storage input, storing system data associated with the activity, including received user inputs, unique identifiers of the media files played, and the playback parameters used in their playback;
- responsive to the user storage input, storing the set of video files captured during the activity as part of the information associated with the activity.

13. A method according to claim 1, the computer processes further comprising:
- after the end of the activity, receiving a user storage input;
- responsive to the user storage input, storing system data associated with the activity, including received user inputs, unique identifiers of the media files played, and the playback parameters used in their playback.

14. A method according to claim 1, where the activity is a dance lesson, and each segment is a dance exercise.

15. A method according to claim 14, where the dance lesson is a ballet lesson.

16. A method according to claim 1, where the activity is a figure-skating lesson, and each segment is a figure-skating exercise.

17. A method according to claim 1, where the activity is an aerobics lesson, and each segment is an aerobics exercise.

18. A computer-implemented method for providing a media accompaniment for an activity having a set of segments, where the activity is a lesson involving movements of the body and each segment is an exercise involving a set of movements, the method including computer processes comprising:
- receiving and storing a first user input defining the set of segments for the activity, or in absence of the first user input, then defining the set of segments by default;
- retrieving a set of media files that are appropriate for each of the defined segments;
- receiving and storing a second user input defining a set of media files for each of the defined segments, or in absence of the second user input, then defining the set of media files by default;
- receiving, for each one of the defined media files, a third user input defining a distinct set of playback parameters or in absence of the third user input, then defining the distinct set of playback parameters by default;
- receiving a fourth user input signaling the beginning of the activity; and
- causing play back of the defined set of media files according to the defined set of playback parameters;
- repeatedly testing for the presence of an in-play user input during the activity, wherein the-in play user input is either a change signal that includes a modification of at least one member of the set of playback parameters or an end-of-activity signal and the modification of playback parameters includes a tempo change without affecting the pitch, or one playback action, selected from the group consisting of start, stop, pause, fast-forward, rewind, skip forward, skip back, repeat, and adding an additional segment to be accompanied; where the in-play user input is received in the form of speech;
- when the in-play user input is determined to be present, then decoding the in-play user input, wherein decoding the in-play user input includes using a speech recognition module;
- when the decoded in-play input is an end-of-activity signal, exiting the computer program accompanying the activity;
- when the decoded in-play input is a change signal, adjusting the playback of the media file according to the modification; and
- prior to receiving the first user input, receiving a user name input specifying a user name;
- checking whether the user name appears in a stored list of known user names;
- if the user name does not appear in the stored list, adding the user name to the stored list;
- if the user name does appear in the stored list, checking if any user information was previously stored, wherein the user information if stored includes a speaker-dependent speech recognition model used by the speech recognition module;
- if any user information was previously stored, retrieving the previously stored user information and applying the user information as applicable to any of one or more of the first, second and third user inputs;
- receiving user utterances of a predefined sequence of words; and
- creating an update to the speech recognition model based on the received user utterances; and
- receiving and storing any update to the user information, wherein the update to the user information includes the update to the speech recognition model.

* * * * *